United States Patent Office 3,458,565
Patented July 29, 1969

3,458,565
[(3-OXO-1-ALKENYL)ARYLOXY]ALKANOIC ACIDS AND DERIVATIVES THEREOF
John B. Bicking and Edward J. Cragoe, Jr., Lansdale, Pa., assignors to Merck & Co., Inc., Rahway, N.J., a corporation of New Jersey
No Drawing. Filed Feb. 1, 1966, Ser. No. 523,908
Int. Cl. C07c *63/60, 93/00, 103/20*
U.S. Cl. 260—520        16 Claims

ABSTRACT OF THE DISCLOSURE

[(3-oxo-1-alkenyl)phenoxy]alkanoic acid products and the acid addition salts, esters and amide derivatives thereof which are substituted in the phenoxy ring by from one to four halo, alkyl, nitro, lower alkanamido, etc. substituents. The said products are diuretic and saluretic agents useful in the treatment of hypertension.

The products are prepared by four routes: (1) via the condensation of a nuclear formyl substituted phenoxyalkanoic acid with an appropriate aldehyde or ketone; (2) via the etherification of a (3-oxo-1-alkenyl)phenol; (3) via the hydrolysis of a [(3-oxo-1-alkenyl)phenoxy]alkanoic acid ester; or (4) via the hydrolysis of an appropriate [(3-disubstituted amino-1,3-alkadien-1-yl)phenoxy]alkanoic acid ester.

---

This invention relates to a new class of chemical compounds which can be described generally as [(3-oxo-1-alkenyl)aryloxy]alkanoic acids and to the nontoxic, pharmacologically acceptable salts, esters and amide derivatives thereof.

Also, it is an object of this invention to describe novel methods of preparation for the foregoing [(3-oxo-1-alkenyl)aryloxyl]alkanoic acids, esters and amides.

Pharmacological studies show that the instant products are effective diuretic and saluretic agents which can be used in the treatment of conditions associated with electrolyte and fluid retention and hypertension. When administered in therapeutic dosages, in conventional vehicles, the instant products effectively reduce the amount of sodium and chloride ions in the body, lower dangerous excesses of fluid levels to acceptable limits and, in general, alleviate conditions usually associated with edema.

The [(3-oxo-1-alkenyl)aryloxy]alkanoic acids of the invention are compounds having the following structural formula:

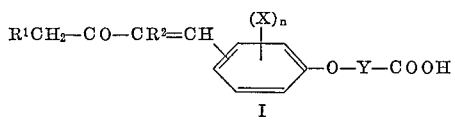

I wherein $R^1$ and $R^2$ are similar or dissimilar members selected from the group consisting of hydrogen, alkyl, for example, lower alkyl such as methyl, ethyl, propyl, isopropyl, butyl, pentyl, etc. and, taken together, $R^1$ and $R^2$ may be joined to form an alkylene chain containing from one to three carbon atoms between their points of attachment to the acylvinyl group, for example, an alkylene chain of the formula —$C_mH_{2m}$— wherein $m$ is an integer having a value of one to three or, alternatively, $R^1$ and $R^2$ may be joined to form a mononuclear cycloalkylidene substituted alkylene chain wherein the chain contains two to three carbon atoms between its points of attachment to the acylvinyl group, for example, a cycloalkylidene substituted propylene chain of the formula —C[=C(CH$_2$)$_x$](CH$_2$)$_z$— wherein $x$ is an integer having a value of four to five and $z$ is an integer having a value of two to three; the X radicals are similar or dissimilar members selected from the group consisting of halogen, alkyl, for example, lower alkyl; nitro; alkanamido, for example, lower alkanamido such as acetamido; and, taken together, two X radicals on adjacent carbon atoms of the benzene ring may be joined to form an hydrocarbylene chain (i.e., a divalent organic radical composed solely of carbon and hydrogen) containing from three to four carbon atoms between their points of attachment, for example, trimethylene, tetramethylene, 1,3-butadienylene (i.e., —CH=CH—CH=CH—), etc.; Y is a member selected from the group consisting of alkylene and haloalkylene having a maximum of six carbon atoms and which contain from one to three linear carbon atoms between the carboxy and oxygen moieties, for example, methylene, ethylene, ethylidene, trimethylene, propylidene, isopropylidene, fluoromethylene, etc.; and $n$ is an integer having a value of one to four.

A preferred embodiment of the invention relates to the [(3-oxo-1-alkenyl)phenoxy]alkanoic acids having the following structural formula:

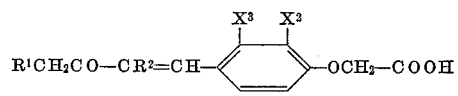

wherein $R^1$ and $R^2$ are similar or dissimilar members selected from the group consisting of hydrogen and lower alkyl and $X^2$ and $X^3$ are similar to dissimilar members selected from the group consisting of halogen, lower alkyl and, taken together, may be joined to form a 1,3-butadienylene chain (i.e., —CH=CH—CH=CH—). The foregoing class of compounds exhibits particularly good diuretic and saluretic activity and represents a preferred subgroup of compounds within the scope of this invention.

The [(3-oxo-1-alkenyl)aryloxy]alkanoic acids (I) of the invention are conveniently prepared by one or more of four alternate processes. The first method of preparation relates to the condensation of a formyl substituted aryloxyalkanoic acid (II) with an appropriate aldehyde or ketone; the second involves the etherification of a (3-oxo-1-alkenyl)-phenol (IV); the third relates to the hydrolysis of an ester of a [(3-oxo-1-alkenyl)aryloxy]alkanoic acid (VI, infra); and the last involves the hydrolysis of a suitable [(3-disubstituted amino-1,3-alkadien-1-yl)aryloxy]alkanoic acid ester (VII, infra).

The first of the aforementioned processes, that is, the conednsation process, for preparing the products (I) of the invention relates specifically to the reaction of a formyl substituted aryloxyalkanoic acid (II, infra) with a suitable aldehyde or ketone (III). The reaction is advantageously conducted in the presence of a catalyst, for example, in the presence of an aqueous solution of an alkali metal hydroxide such as sodium hydroxide, potassium hydroxide, lithium hydroxide, etc. and the alkali metal salt of the product thus formed is then treated with an acid to obtain the desired [(3-oxo-1-alkenyl)aryloxy]alkanoic acid (I). The following equation illustrates the reaction:

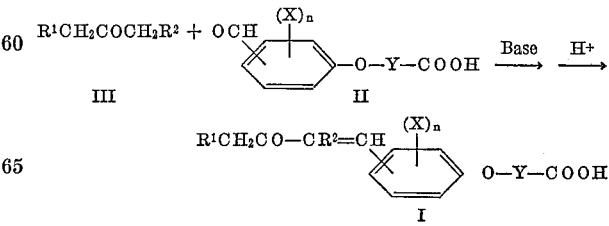

wherein $R^1$, $R^2$, X, Y and $n$ are as defined above and $H^+$ is the cation derived from an organic or inorganic acid such as hydrochloric acid. The reaction is preferably conducted at ambient temperatures but higher temperatures may also be employed.

The second principal method by which the products (I) of the invention are prepared relates to the reaction of a (3-oxo-1-alkenyl)phenol (IV, infra) with a suitable etherification reagent, in the presence of a base, followed by the conversion of the [(3-oxo-1-alkenyl)aryloxy]alkanoic acid salt (Ia, infra) thus formed to the corresponding free acid (Ib, infra) by acidification of the reaction mixture. Suitable bases which may be used in the process include the alkali metal carbonates such as potassium carbonate, the alkali metal alkoxides such as sodium ethoxide, etc. The etherification reagent is a haloalkanoic acid salt having the following formula: $X^1-Y^1-COOM$ wherein $X^1$ is halogen, for example, chlorine, bromine, iodine, etc.; $Y^1$ is a methylene or trimethylene radical which may be appropriately substituted by alkyl or halogen radicals such as a monofluoro group and M is hydrogen or the cation derived from an alkali metal hydroxide, an alkali metal carbonate, etc. such as a sodium or potassium cation. The following equation wherein the etherification reagent employed is an haloalkanoic acid and the basic reagent is potassium carbonate, illustrates this method of preparation; however, it is to be understood that the alkali metal salts of the haloalkanoic acid reactant may also be employed in an otherwise similar process and that other basic reagents such as sodium carbonate or alkali metal alkoxides may also be employed:

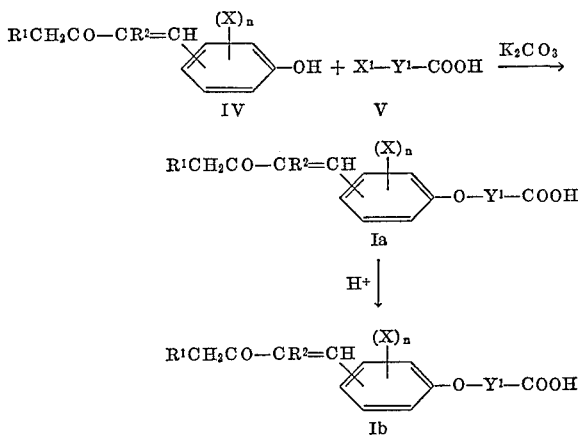

wherein $R^1$, $R^2$, X, $X^1$, $Y^1$, n and $H^+$ are as defined above. The choice of a suitable reaction solvent is dependent largely upon the character of the reactants and, in general, any solvent which is substantially inert to the reactants employed and in which the reagents are reasonably soluble may be used; however, ethanol and acetone are particularly advantageous solvents in which to conduct the process. Also, the reaction may be carried out at ambient temperatures but, generally, it is desirable to conduct the reaction at temperatures slightly above ambient temperature.

The foregoing etherification reaction is most suitable for obtaining those [(3-oxo-1-alkenyl)aryloxy]alkanoic acid products (Ia, supra) which contain an alkylene chain having a single carbon atom or three carbon atoms between the carboxy group and oxygen atom; this is apparent from the definition of the etherification reagent, $X^1-Y^1-COOM$ (see the preceding paragraph) wherein $Y^1$ is defined as a methylene or trimethylene radical.

Those [(3-oxo-1-alkenyl)aryloxy]alkanoic acids which contain two linear carbon atoms in the alkylene chain between the carboxy group and oxygen atom are also obtained by the etherification of a (3-oxo-1-alkenyl)phenol (IV, infra) but, in lieu of employing the metal salt of a haloalkanoic acid as described in the preceding paragraphs, a propiolactone or an appropriately substituted derivative thereof, is employed. The reaction of the (3-oxo-1-alkenyl)phenol (IV) with the lactone is conducted in the presence of a base such as an aqueous solution of sodium hydroxide and, preferably, with heating at reflux temperatures. Acidification of the resulting mixture (Ic, infra) thus obtained yields the desired product (Id, infra). The following equation illustrates the reaction:

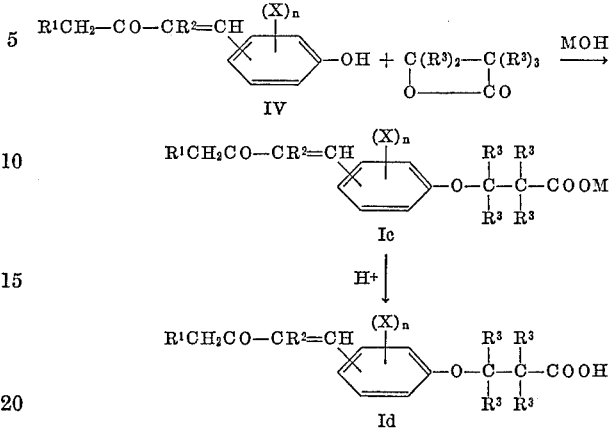

wherein M, $R^1$, $R^2$, X, n and $H^+$ are as defined above and the $R^3$ radicals are similar or dissimilar substituents selected from the group consisting of hydrogen and lower alkyl.

The third principal method for preparing the products of the invention consists in the hydrolysis of an ester of an appropriate [(3-oxo-1-alkenyl)aryloxy]alkanoic acid (VI, infra). The hydrolysis is conducted in the conventional manner by treatment of the said ester (VI) with an aqueous solution of an acid as, for example, with an aqueous solution of hydrochloric acid, in which instance a solvent such as acetic acid can be used, or, alternatively, the hydrolysis may be conducted with an aqueous solution of a base such as an aqueous solution of sodium bicarbonate, in which instance the use of an alcoholic solvent such as a lower alkanol is advantageous; however, when an aqueous solution of a base is employed it is necessary to treat the carboxylate salt intermediate thus formed with an acid to obtain the desired product. The following equation illustrates this method of preparation.

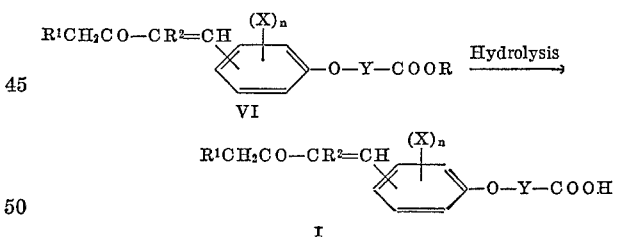

wherein $R^1$, $R^2$, X, Y and n are as defined above and R is an hydrocarbyl radical, that is, an organic radical composed solely of carbon and hydrogen such as an alkyl radical, etc.

The fourth principal method for preparing the instant products also relates to the hydrolysis of a [(3-disubstituted amino-1,3-alkadien-1-yl)aryloxy]alkanoic acid ester (VII, infra). The hydrolysis is conveniently carried out in a mixture of acetic acid, water and a strong acid such as hydrochloric acid, with slight heating. Preferably,, the hydrolysis mixture is heated on a steam bath for a period of 15 minutes to one hour. The following equation illustrates this method of preparation:

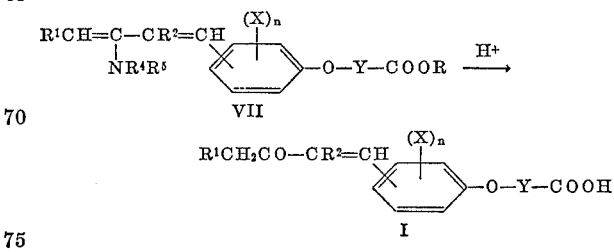

wherein R, $R^1$, $R^2$, X, $n$ and $H^+$ are as defined above; $R^4$ and $R^5$ represent similar or dissimilar alkyl radicals which may be joined together directly or through a hetero atom such as oxygen, to the nitrogen atom to which they are attached to form a hetercocyclic ring such as pyrrolidinyl, piperidino, morpholino, piperazinyl, N-alkylpiperazinyl, etc.

The [(3-oxo-1-alkenyl)aryloxy]alkanoic acids (I) of the invention are generally obtained as crystalline solids and, if desired, may be purified by recrystallization from a suitabe solvent. Suitable solvents include, for example, ethyl acetate, isopropyl alcohol, nitromethane, acetic acid, acetonitrile, etc. or mixtures of solvents such as a mixture of ethyl acetate and hexane or a mixture of butanone and hexane, etc.

The formyl substituted aryloxyalkanoic acids (II) which are employed as starting materials in the aforementioned reaction with the aldehyde or ketone reactants (III, supra) are prepared from their appropriate nuclear hydroxy substituted benzaldehyde precursors (VIII, infra) by the reaction of the latter with an appropriate etherification reagent.

When, for example, it is desired to prepare a formyl substituted aryloxyalkanoic acid (IIa, infra) wherein the alkylene chain of the alkanoic acid moiety has one or three linear carbon atoms in the chain between the carboxy group and oxygen atoms, the etherification reagent is an alkali metal or an alkaline earth metal salt of a suitable haloakonoic acid having the formula $$X^1—Y^1—COOM$$

wherein M, $X^1$ and $Y^1$ are as defined above. In general, the etherification is conducted in the presence of a base such as an aqueous solution of sodium or potassium carbonate or in the presence of the corresponding hydroxide or in the presence of a sodium alcoholate such as sodium ethoxide, and the alkanoic acid salt thus obtained is then converted to the desired formyl substituted aryloxyalkanoic acid derivative (IIa) in the convenitional manner by treatment with an acid such as hydrochloric acid. The following equation illustrates the reaction:

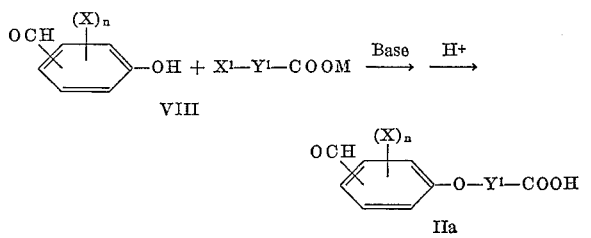

wherein M, X, $X^1$, $Y^1$, $n$ and $H^+$ are as defined above. The choice of a suitable reaction solvent for the process is dependent largely upon the character of the reactants employed; however, in general, it can be stated that any solvent which is substantially inert with respect to the reactants employed and in which the reagents are reasonably soluble may be used. Solvents which have proved to be particularly advantageous include ethanol and dimethylformamide. Also, the reaction may be carried out at ambient temperatures but, generally, it is desirable to conduct the reaction at temperatures slightly above ambient temperature.

Those formyl substituted aryloxyalkanoic acid starting materials (IIb, infra) wherein the alkylene chain contains two linear carbon atoms between the carboxy group and oxygen atom are prepared from their corresponding nuclear hydroxy substituted benzaldehydes (VIII) by the reaction of the latter with propiolactone or with an appropriately substituted propiolactone, in the presence of a base such as an aqueous solution of sodium hydroxide, preferably, while heating the solution at reflux temperatures; followed by the acidification of the carboxylate intermediate thus formed to obtain the corresponding formyl substituted aryloxyalkanoic acid (IIb). The following equation illustrates the reaction:

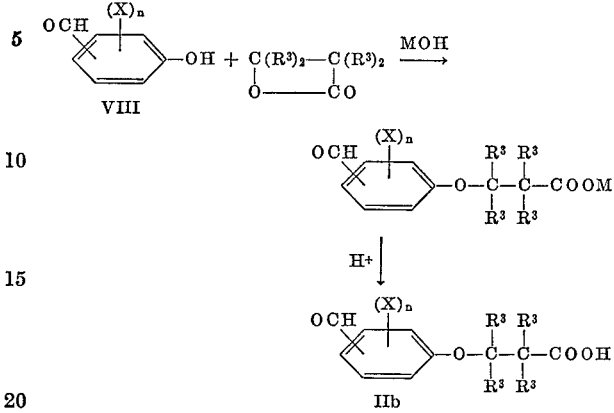

wherein M, $R^3$, X, $n$ and $H^+$ are as defined above.

Also, the formyl substituted aryloxyalkanoic acids (II) may be prepared by hydrolysis, in an aqueous solution of an acid or a base, of the corresponding formyl substituted aryloxyalkanoic acid ester (IX, infra) as shown by the following equation:

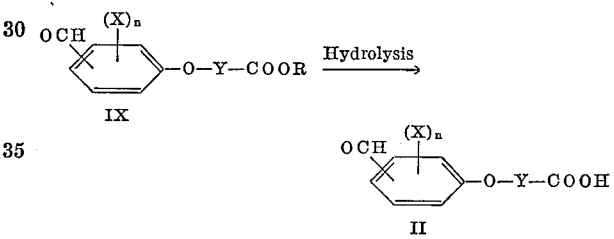

wherein R, X, Y and $n$ are as defined above.

The (3-oxo-1-alkenyl)phenols (IV) which are used as starting materials in the second principal method for preparing the instant products, that is, the etherification process, supra, are prepared by either of two routes. The first method of preparation consists in the reaction of a nuclear hydroxy substituted benzaldehyde (VIII) with a suitable aldehyde or ketone (III). The condensation may be carried out either in the presence of a base as, for example, in the presence of an alkali metal hydroxide such as sodium hydroxide or, alternatively, in the presence of an acid as, for example, hydrochloric acid, However, when either the R or $R^1$ radicals represents hydrogen the choice of a suitable catalyst determines the structure of the (3-oxo-1-alkenyl)phenol (IV). When, for example, a basic catalyst is employed, the point of condensation on the ketone reactant (III) is at the methylene carbon bearing the alkyl group, whereas, when an acid catalyst is used, the point of condensation is at the methylene carbon bearing the hydrogen atom. The reaction is advantageously conducted at ambient temperatures and, usually, over a period of from 24–27 hours:

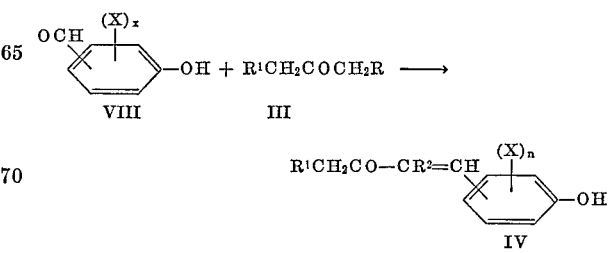

wherein R, $R^1$, X and $n$ are as defined above.

The second method of preparation for the (3-oxo-1-alkenyl)phenols (IV) consists in the hydrolysis of an appropriate (3-disubstituted amino-1,3-alkadien-1-yl)phenol (X, infra). The hydrolysis is conducted in a mixture of acetic acid, water and a strong acid such as hydrochloric acid and, preferably, with the application of heat as, for example, by heating on the steam bath for approximately 15 minutes to one hour:

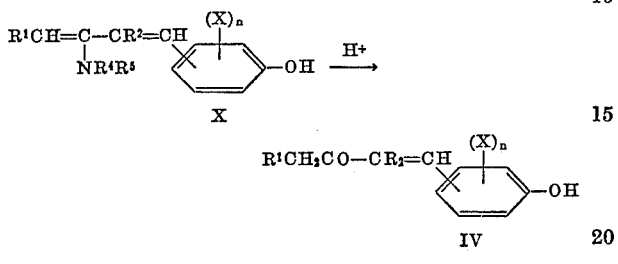

wherein $R^1$, $R^2$, $R^4$, $R^5$, X, n and $H^+$ are as defined above.

The [(3-oxo-1-alkenyl)aryloxy]alkanoic acid esters (IV) which have been described above in connection with the third principal method for preparing the products of the invention (I) are useful not only as chemical intermediates but are themselves active as diuretics. The said esters may be prepared by one or more of four different methods: (a) by the etherification of a (3-oxo-1-alkenyl)phenol (IV, infra) by reaction of the said phenol (IV) with a suitable haloalkanoic acid ester; (b) by the condensation of a formyl substituted aryloxyalkanoic acid ester (IX, infra) with a suitable aldehyde or ketone; (c) by the reaction of an appropriate Schiff base intermediate (XI, infra) with a suitable aldehyde or ketone and (d) by the esterification of a [(3-oxo-1-alkenyl)aryloxy]alkanoic acid (I) according to conventional methods. These methods of preparation are discussed further below.

The etherification process (a) for preparing the said ester derivatives relates specifically to the reaction of a (3-oxo-1-alkenyl)phenol (IV) with an appropriate haloalkanoic acid ester having the formula $X^1$—$Y^1$—COOR wherein R, $X^1$ and $Y^1$ are as defined hereinabove. The following equation illustrates the reaction:

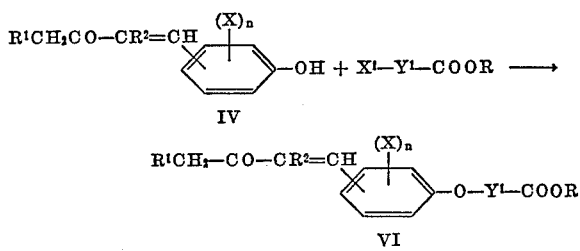

wherein R, $R^1$, $R^2$, X, $X^1$, $Y^1$ and n are as defined above. In general, the reaction is conducted in the presence of a base such as sodium or potassium carbonate, sodium or potassium hydroxide or in the presence of a sodium alcoholate such as sodium ethoxide. The choice of a suitable reaction solvent is dependent largely upon the character of the reactants employed but, in general, any solvent which is substantially inert with respect to the reactants and in which the reagents are reasonably soluble may be used. For example, ethanol and dimethylformamide have proved to be particularly advantageous solvents in which to conduct the reaction. The process may be carried out at ambient temperatures but, generally, it is desirable to conduct the process at temperatures above ambient temperature.

The condensation process (b) for preparing the ester derivatives (VI) involves the reaction of a formyl substituted aryloxyalkanoic acid ester (IX) with a suitable aldehyde or ketone (III) in the presence of an acid catalyst such as hydrogen chloride or boron trifluoride. The reaction may be conducted in the absence of a solvent but, if desired, an excess of an aldehyde or ketone may be used as the reaction medium. The application of heat is not necessary to the reaction and, in general, the synthesis is advantageously conducted at ambient temperatures:

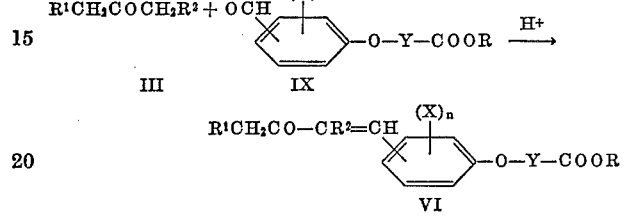

wherein R, $R^1$, $R^2$, X, Y and n are as defined above.

The synthesis of the [(3-oxo-1-alkenyl)aryloxy]alkanoic acid esters (VI) by way of the Schiff base intermediates (c) consists in treating an ester of a suitable (N-substituted iminomethylaryloxy)alkanoic acid (XI, infra) with an appropriate aldehyde or ketone (III) in the presence of an acid catalyst such as hydrochloric acid and, preferably, in a solvent such as dimethylformamide. The ester (VI) thus obtained may be isolated and purified for use as a diuretic or, alternatively, for use as a chemical intermediate, but, as a practical matter, when the said ester (VI) is to be employed as an intermediate in the synthesis of the carboxylic acid products (I) of this invention, it is advantageous to omit the isolation and purification step and, instead, hydrolyze the ester (VI) directly to the desired acid (I). The following equation illustrates this method of preparation:

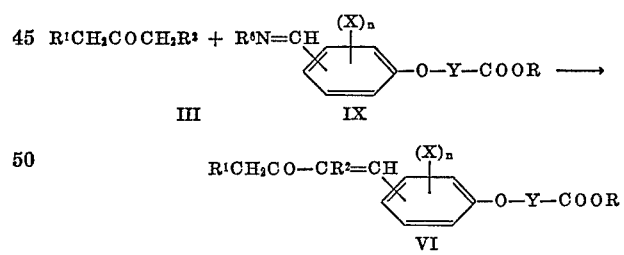

wherein R, $R^1$, $R^2$, X, Y and n are as defined above and $R^6$ is an alkyl radical, aryl, etc.

The esterification method (d) for the preparation of the [(3-oxo-1-alkenyl)aryloxy]alkanoic acid esters (VI) consists in converting the corresponding [(3-oxo-1-alkenyl)aryloxy]alkanoic acids (I) to their corresponding esterified derivatives by either of two alternate methods of preparation. According to one method a [(3-oxo-1-alkenyl)aryloxy]alkanoic acid (I) is treated with an appropriate lower alkanol, preferably, in the presence of a catalyst such as an acid for example, sulfuric acid, to obtain the corresponding esterified product (VI); or, alternatively, according to the second method the [(3-oxo-1-alkenyl)aryloxy]alkanoic acid (I) is converted to the corresponding acid halide (XII, infra) by treating the said acid with an appropriate halogenating agent such as thionyl chloride, followed by the reaction of the acid halide thus formed with an appropriate alcohol as, for example, with a lower alkanol or with a dialkylamino substituted lower alkanol such as 2-diethylaminoethanol, to prepare the corresponding esterified product (VI). The following equations illustrate these processes:

gen cyanide and hydrogen chloride(gas) in the presence of anhydrous aluminum chloride. This reaction is preferably conducted in an inert solvent as, for example, in a

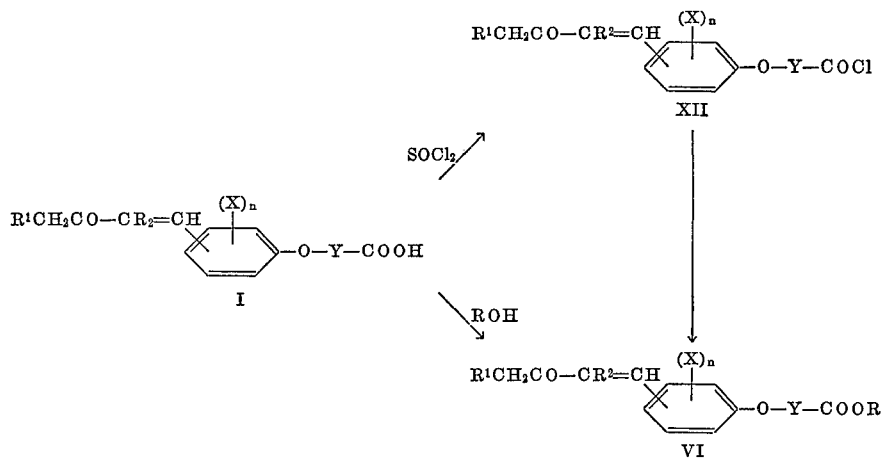

wherein R, $R^1$, $R^2$, X, Y and $n$ are as defined above.

The [[3-(disubstituted amino - 1,3 - alkadien-1-yl)]-aryloxy]alkanoic acid esters (VII) which are also employed as starting materials in the preparation of the instant products (I) are prepared by the reaction of a formyl substituted aryloxyalkanoic acid ester (IX) with an enamine (XIII, infra) derived from the reaction of a secondary amine with an appropriate aldehyde or ketone (i.e., III, supra) and, preferably, in a water-immiscible solvent in which the reactants and products are reasonably soluble, such as toluene or benzene. Also, it is advantageous to add a small amount of a carboxylic acid such as acetic acid or the amine salt of a carboxylic acid wherein the amine is identical to the secondary amine which is used in the preparation of the enamine reactant. Also, it is desirable to remove the water formed during the reaction as, for example, by the use of molecular sieves, azeotropic distillation, chemical dehydrating agents, etc. The following equation illustrates this method of preparation:

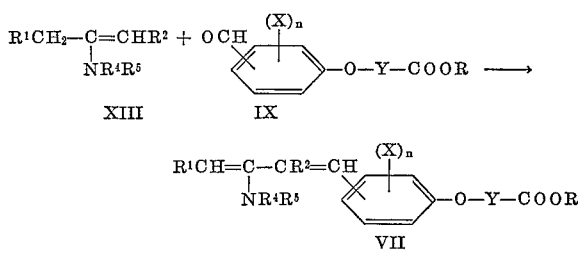

wherein R, $R^1$, $R^2$, $R^4$, $R^5$, X, Y and $n$ are as defined above.

The nuclear hydroxy substituted benzaldehyde intermediates (VIII) are either known compounds or may be prepared by methods which are known to those skilled in the art. Thus, for example, by treating a phenol or an appropriate nuclear substituted derivative thereof with chloroform in the presence of an aqueous solution of a base and then treating the resulting mixture with an acid such as hydrochloric acid, the corresponding nuclear hydroxy substituted benzaldehyde is obtained. Alternatively, the said hydroxy substituted benzaldehyde intermediates may also be obtained by the reaction of a phenol, or an appropriate nuclear substituted derivative thereof, with hydrobenzene solution. The following equation illustrates these methods of preparation:

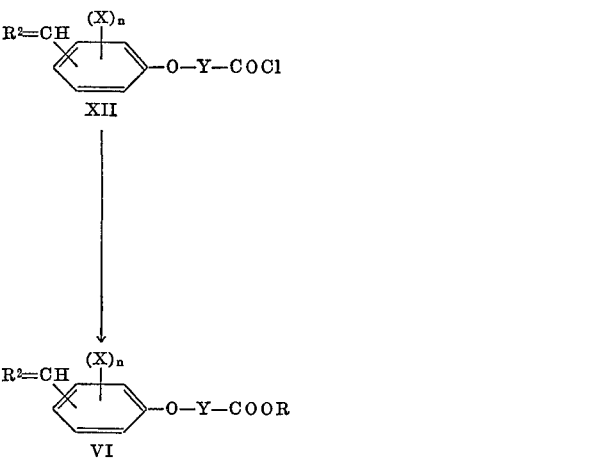

wherein X and $n$ are as defined above.

The formyl substituted aryloxyalkanoic acid esters (IX) which are intermediates in the preparation of the [(3-oxo-1-alkenyl)aryloxy]alkanoic acid esters (VI) are prepared by one of three methods: (a) by the etherification of an appropriate nuclear hydroxy substituted benzaldehyde (VIII); (b) by the esterification of a formyl substituted aryloxyalkanoic acid (II); or (c) by the formylation of an aryloxyalkanoic acid ester (XII, infra).

The etherification process (a) for preparing the formyl substituted aryloxyalkanoic acid esters (IXa, infra) is conducted in a manner similar to that described above for the etherification of the (3-oxo-1-alkenyl)phenols (IV), i.e., by treating a nuclear hydroxy substituted benzaldehyde (VIII, infra) with an haloalkanoic acid ester of the formula: $X^1$—$Y^1$—COOR. The following equation illustrates the reaction:

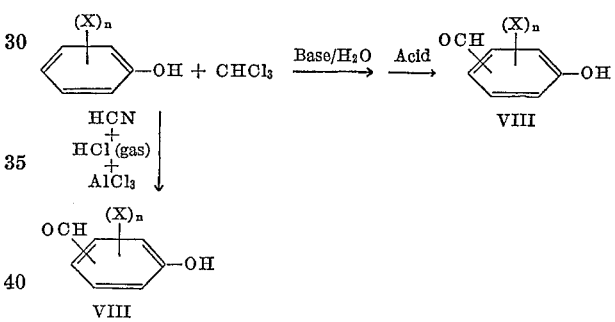

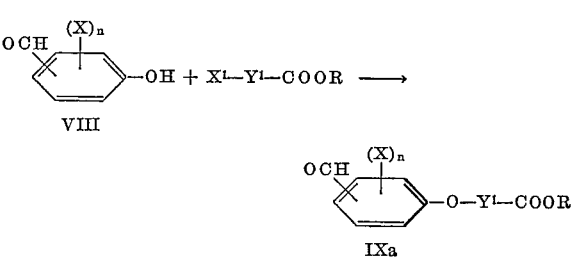

wherein R, X, $X^1$, $Y^1$ and $n$ are as defined above. The reaction is conducted in the presence of a base such as sodium or potassium carbonate or sodium or potassium hydroxide or in the presence of a sodium alcoholate such as sodium ethoxide. Suitable reaction solvents may be employed but ethanol or dimethylformamide have proved to be particularly advantageous reaction medium. Also, the process may be conducted at ambient temperatures but, generally, it is desirable to conduct the reaction at temperatures above ambient temperature.

The esterification process (b) for the preparation of the formyl substituted aryloxyalkanoic acid esters (IX) is effected by the reaction of an appropriate formyl substituted aryloxyalkanoic acid (II) with an appropriate lower alkanol, substituted lower alkanol, etc., to obtain the corresponding esterified product or, alternatively, by the reaction of a formyl substituted aryloxyalkanoic acid (II) with a suitable halogenating agent to form the corresponding acid halide and then treating the said formyl substituted aryloxyalkanoic acid halide (XIV) thus formed with a lower alkanol or with a substituted lower alkanol to prepare the corresponding esterified product (IX). The following equation illustrates the reaction:

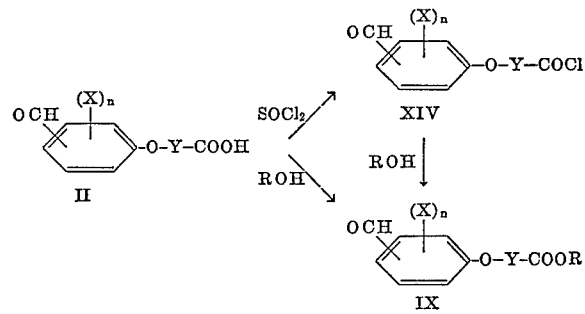

wherein R, X and $n$ are as defined above.

The formylation process (c) for preparing the formyl substituted aryloxyalkanoic acid ester intermediates (IX) is conducted by treating an appropriate aryloxyalkanoic acid ester (XV, infra) with formaldehyde and concentrated hydrochloric acid to obtain the corresponding chloromethyl substituted aryloxyalkanoic acid ester (XVI, infra) and the chloromethyl derivative thus obtained is then treated with hexamethylenetetramine and concentrated hydrochloric acid under reflux to obtain the desired formyl substituted compound (IX). The following equation illustrates the process:

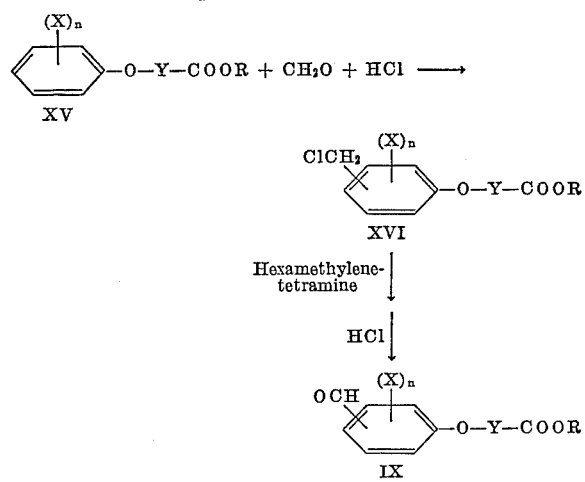

wherein R, X, Y and $n$ are defined as above.

The (3-disubstituted-1,3-alkadien-1-yl)phenols (X, infra), from which the (3-oxo-1-alkenyl)phenol intermediates (IV, supra) are obtained, can be conveniently synthesized by the reaction of a nuclear hydroxy substituted benzaldehyde (VIII) with an enamine (XIII, infra) derived from the reaction of a secondary amine with an appropriate aldehyde or ketone (i.e., III, supra). The reaction is advantageously conducted in a water-immiscible solvent in which the reactants and products are reasonably soluble and in the presence of a small amount of carboxylic acid catalyst such as a lower alkanoic acid, for example, acetic acid or in the presence of an amine salt of a lower alkanoic acid. Also, it is desirable to remove the water formed during the process as, for example, by the use of molecular sieves, azeotropic distillation, chemical dehydrating agents, etc. The following equation illustrates the reaction:

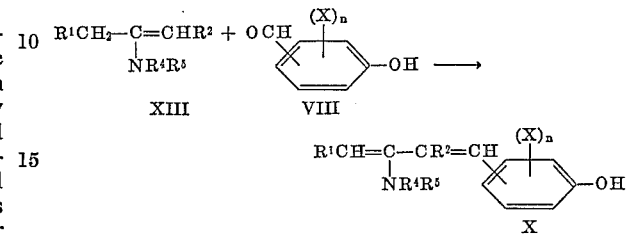

wherein $R^1$, $R^2$, $R^4$, $R^5$, X and $n$ are as defined above.

The Schiff base intermediates (XI), which are used in the preparation of the [(3-oxo-1-alkenyl)aryloxy]alkanoic acid esters (VI, supra), are prepared by the condensation of a formyl substituted aryloxyalkanoic acid ester (IX) with a primary amine such as an alkylamine or an arylamine. It is usually desirable to conduct the reaction in a water-immiscible solvent such as benzene or toluene and to remove the water formed during the reaction by azeotropic distillation or other conventional means as, for example, by the use of chemical dehydrating agents or molecular sieves. Also, it is advantageous to add a catalytic amount of a carboxylic acid to the reaction mixture as, for example, a lower alkanoic acid such as acetic acid and to conduct the reaction at the reflux temperature of the solvent system. The following equation illustrates this method of preparation:

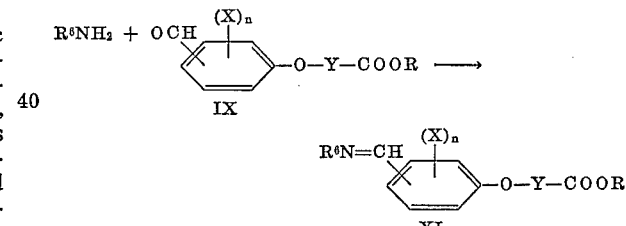

wherein R, $R^6$, X, Y and $n$ are as defined above.

Included within the scope of this invention are the non-toxic, pharmacologically acceptable acid addition salts of the instant products (I). In general, any base which will form an acid addition salt with the [(3-oxo-1-alkenyl)-aryloxy]alkanoic acids (I) and whose pharmacological properties will not cause an adverse physiological effect when ingested by the body system is considered as being within the scope of this invention; suitable bases thus include, for example, the alkali metal and alkaline earth metal hydroxides, carbonates, etc., ammonia, primary, secondary and tertiary amines such as monoalkylamines, dialkylamines, trialkylamines, nitrogen containing heterocyclic amines, for example, piperidine, etc.

Also included within the scope of this invention are the amide derivatives of the instant [(3-oxo-1-alkenyl)-aryloxy]alkanoic acids (I) which may be prepared by several methods. According to one method the amide derivatives may be prepared by converting a [(3-oxo-1-alkenyl)aryloxy]alkanoic acid (I) to the corresponding acid halide or ester in the manner described hereinabove, and treating the said acid halide or ester derivative with ammonia, methoxyamine or with an appropriate monoalkylamine, dialkylamine, dialkylaminoalkylamine or with an heterocyclic amine such as pyrrolidine, piperidine, morpholine, etc. to produce the corresponding amide derivative. Another method of preparation consists in the reaction of a [(3-oxo-1-alkenyl)aryloxy]alkanoic acid (I) with a special reagent such as dicyclohexylcarbodiimide, N-ethyl-5-phenylisoxazolium - 3′ - sulfonate, 1,1′-carbonyldiimidazole, 1,1'-thionyldiimidazole, etc. and treating the intermediate thus formed with ammonia or a suitable amine to form the corresponding amide product. Still another method for preparing the amide derivatives of the instant products (I) comprises the etherification of a (3-oxo-1-alkenyl)phenol (IV) with an haloalkanoic acid amide of the formula: $X^1$—$Y^1$—$CONR^7R^8$ wherein $X^1$ and $Y^1$ are as defined above and $R^7$ and $R^8$ are selected from the group consisting of hydrogen, alkyl, hydroxyalkyl, haloalkyl, aralkyl, alkoxyalkyl and dialkylaminoalkyl. These and other equivalent methods for the preparation of the amide derivatives of the instant products (I) will be apparent to those having ordinary skill in the art and to the extent that the said derivatives are both nontoxic and physiologically acceptable to the body system, the said amides are the functional equivalent of the corresponding [(3-oxo - 1-alkenyl)aryloxy]alkanoic acid products (I).

The examples which follow illustrate the [(3-oxo-1-alkenyl)aryloxy]alkanoic acids (I) of the invention and the methods by which they are prepared. However, the examples are illustrative only and it will be apparent to those having ordinary skill in the art that all of the products embraced by Formula I, supra, may also be prepared in an analogous manner by substituting the appropriate starting materials for those set forth in the examples.

EXAMPLE 1

[2,3-dichloro-4-(2-methyl-3-oxo-1-butenyl)phenoxy] acetic acid

Step A: 2,3-dichloro-4-hydroxybenzaldehyde.—In a 5 liter, three-necked flask, equipped with a mechanical stirrer, condenser, thermometer and dropping funnel, is placed water (2000 ml.), calcium hydroxide (280 g., 3.78 moles), sodium carbonate (320 g., 3.02 moles) and 2,3-dichlorophenol (142.6 g., 0.875 mole). The resulting suspension is heated on a steam bath to 65° C. and to it is added chloroform (208 g., 1.75 moles), dropwise, with stirring, while maintaining the temperature at 60–70° C. After addition is complete, the mixture is stirred and heated at 60–70° C. for one hour.

The reaction mixture is chilled in an ice bath and acidified with concentrated hydrochloric acid. The mixture is extracted with ethyl acetate (approximately 3 liters) and the extract is dried over magnesium sulfate. The solvent is removed by distillation under reduced pressure and the solid residue is recrystallized from toluene to obtain 37.8 g. (23%) of 2,3-dichloro-4-hydroxybenzaldehyde, M.P. 177–182° C. Two additional recrystallizations from acetonitrile give 28.4 g. (17%) of 2,3-dichloro-4-hydroxybenzaldehyde in the form of white prisms having a melting point of 184–185° C.

Analysis.—Calculated for $C_7H_4Cl_2O_2$: C, 44.01; H, 2.11; Cl, 37.12. Found: C, 44.22; H, 2.30; Cl, 37.02.

Step B: 2,3 - dichloro - 4 - (2-methyl-3-oxo-1-butenyl)phenol.—A finely ground suspension of 2,3-dichloro-4-hydroxybenzaldehyde (3.82 g., 0.020 mole) in methyl ethyl ketone (11.18 g.; 0.155 mole) is chilled in an ice bath and treated with dry hydrogen chloride gas for 45 minutes. The resulting dark solution is stirred at room temperature.

After 65 hours the volatile materials are removed under reduced pressure. The residue is dissolved in ether and washed with water. After drying over anhydrous magnesium sulfate, the ether is removed under reduced pressure to give an oil which is triturated with butyl chloride to yield 2.20 g. (45%) of solid, M.P. 155–156° C. Recrystallization from butyl chloride gives 1.87 g. (38%) of 2,3-dichloro-4-(2-methyl-3-oxo-1-butenyl)phenol in the form of white prisms, M.P. 157–159° C.

Analysis.—Calculated for $C_{11}H_{10}Cl_2O_2$: C, 53.90; H, 4.11; Cl, 28.93. Found: C, 53.61; H, 4.00; Cl, 28.93.

Step C: [2,3-dichloro - 4 - (2-methyl-3-oxo-1-butenyl)-phenoxy]acetic acid.—To a solution of 2,3-dichloro-4-(2-methyl-3-oxo-1-butenyl)phenol (2.68 g., 0.0109 mole) in dimethylformamide (11 ml.) is added potassium carbonate (3.32 g.; 0.0240 mole). Then ethyl bromoacetate (4.01 g., 0.0240 mole) is added and the reaction mixture is heated at 55–60° C. for 1.5 hours with stirring.

The reaction mixture is cooled in ice and treated with water (55 ml.). The resulting solid ester is collected by filtration and washed with water.

The ester is treated with a mixture of acetic acid (18 ml.) and 5% hydrochloric acid (9 ml.) and heated on a steam bath for 0.5 hour with stirring. The cooled reaction solution is diluted with water (27 ml.) and a white solid separates. There is obtained 3.15 g. (95.4%) of material, M.P. 164–169° C. Recrystallization from nitromethane gives 2.45 g. (74.3%) of [2,3-dichloro-4-(2-methyl-3-oxo-1-butenyl)phenoxy]acetic acid in the form of white needles, M.P. 173.5–174.5° C.

Analysis.—Calculated for $C_{13}H_{12}Cl_2O_4$: C, 51.51; H, 3.99; Cl, 23.39. Found: C, 51.43; H, 4.06; Cl, 23.32.

In a manner similar to that described in Example 1 for the preparation of [2,3-dichloro - 4 - (2-methyl-3-oxo-1-butenyl)phenoxy]acetic acid, the products [2-methyl-3-chloro-4-(2-methyl-3-oxo-1-butenyl)phenoxy]acetic acid and [2-chloro-3-methyl - 4 - (2 - methyl-3-oxo-1-butenyl) phenoxy]acetic acid, respectively, are prepared by substituting 2-methyl-3-chlorophenol and 2-chloro-3-methylphenol for the 2,3-dichlorophenol recited in Example 1, Step A, and following substantially the procedure described in Steps A, B and C of that example.

EXAMPLE 2

[2,3-dichloro-4-(2-methyl-3-oxo-1-pentenyl)phenoxy] acetic acid

Step A: 2,3 - dichloro-4-(2-methyl-3-oxo-1-pentenyl)-phenol.—A finely ground suspension of 2,3-dichloro-4-hydroxybenzaldehyde (3.82 g., 0.020 mole) in diethyl ketone (13.35 g., 0.155 mole) is chilled in an ice bath and treated with dry hydrogen chloride gas for 45 minutes. The resulting dark solution then is stirred at room temperature.

After 42 hours the volatile materials are removed under reduced pressure. The residue is dissolved in ether and washed with water. After drying over anhydrous magnesium sulfate, the ether is removed under reduced pressure to give an oil which is triturated with butyl chloride to yield 2.00 g. (38.6%) of a solid, M.P. 101–105° C. Recrystallization from butyl chloride gives 1.37 g. (26.4%) of 2,3-dichloro-4-(2-methyl-3-oxo-1-pentenyl) phenol in the form of white rods, M.P. 112–113° C.

Analysis.—Calculated for $C_{12}H_{12}Cl_2O_2$: C, 55.62; H, 4.67; Cl, 27.36. Found: C, 55.90; H, 4.63; Cl, 27.34.

Step B: [2,3-dichloro-4-(2-methyl-3-oxo-1-phentenyl)-phenoxy]acetic acid.—To a solution of 2,3-dichloro-4-(2-methyl-3-oxo-1-pentenyl)phenol (2.59 g., 0.010 mole) in dimethylformamide (10 ml.) is added potassium carbonate (3.04 g., 0.022 mole). Then ethyl bromoacetate (3.67 g., 0.022 mole) is added and the reaction mixture is heated at 55–60° C. for 1.5 hours with stirring.

The reaction mixture is cooled in ice and treated with water (50 ml.). The resulting solid ester then is collected by filtration and washed with water.

The ester is treated with a mixture of acetic acid (17 ml.) and 5% hydrochloric acid (8.5 ml.) and heated on a steam bath for 0.5 hour with stirring. The cooled reaction solution is diluted with water (25 ml.) and a white solid separates. There is thus obtained 3.17 g. (100%) of material, M.P. 152–154° C. Recrystallization from nitromethane yields 2.71 g. (85.5%) of [2,3-dichloro-4-(2-methyl-3-oxo-1-pentenyl)phenoxy]acetic acid in the form of white needles, M.P. 157–158° C.

*Analysis.*—Calculated for $C_{14}H_{14}Cl_2O_4$: C, 53.02; H, 4.45; Cl, 22.36. Found: C, 53.37; H, 4.52; Cl, 22.24.

EXAMPLE 3

[2,3-dichloro-4-(2-methyl-3-oxo-1-pentenyl)phenoxy] acetic acid

Step A: Ethyl (2,3 - dichloro - 4 - formylphenoxy)-acetate.—A mixture of 2,3-dichloro-4-hydroxybenzaldehyde (708 g., 0.37 mole), potassium carbonate (112 g., 0.81 mole), ethyl bromoacetate (135 g., 0.81 mole) and dimethylformamide (285 ml.) is stirred and heated at 55–60° C. for 1.5 hours. The reaction mixture then is cooled in an ice bath and water (900 ml.) is added. The crystalline produce which separates is collected on a filter and washed with water. Recrystallization from cyclohexane gives 97 g. (95%) of ethyl (2,3-dichloro-4-formylphenoxy)acetate, M.P. 89.5–91.5° C. After two more recrystallizations from cyclohexane the ethyl (2,3-dichloro-4-formylphenoxy)acetate 87.3 g. (85%) melts at 92–93° C.

*Analysis.*—Calculated for $C_{11}H_{10}Cl_2O_4$: C, 47.68; H, 3.64; Cl, 25.59. Found: C, 47.67; H, 3.58; Cl, 25.40.

Step B: [2,3-dichloro-4-(2 - methyl-3-oxo-1-pentenyl)-phenoxy]acetic acid.—To a solution of ethyl (2,3 - dichloro-4-formylphenoxy)acetate (11.08 g., 0.040 mole) in toluene (50 ml.) is added 4-(1-ethylpropenyl)morpholine (7.45 g., 0.048 mole). Then acetic acid (3 ml.) and morpholine (1 ml.) are added and the reaction solution is heated under reflux until the evolution of water ceases.

After 11 hours the reaction mixture is concentrated to dryness under reduced pressure. The residual ester is treated with a mixture of acetic acid (70 ml.) and 5% hydrochloric acid (35 ml.) and heated on a steam bath for 0.5 hour with stirring. The cooled reaction solution is diluted with water and a gum separates. The gum is dissolved in ethanol (70 ml.) and treated with a solution of sodium bicarbonate (6.72 g., 0.08 mole) in water (140 ml.). The resulting solution is heated on a steam bath for 0.5 hour with stirring and then concentrated to dryness under reduced pressure. The residue is dissolved in hot water, treated with decolorizing carbon and filtered. The filtrate then is acidified with 6 N hydrochloric acid whereupon a solid separates. Recrystallization from nitromethane yields 3.06 g. (24%) of [2,3-dichloro - 4 - (2-methyl-3-oxo-1-pentenyl)phenoxy]acetic acid, M.P. 157–158° C.

EXAMPLE 4

[2,3-dichloro-4-(2-oxocyclobutylidenemethyl)phenoxy] acetic acid

Step A: 2,3-dichloro - 4 - (2-oxocyclobutylidenemethyl)phenol.—To a solution of 2,3-dichloro-4-hydroxybenzaldehyde (7.64 g., 0.04 mole) in 12% aqueous sodium hydroxide solution (26.67 ml., 0.08 mole) is added cyclobutanone (5.60 g., 0.08 mole) and the resulting solution is allowed to stir at room temperature.

After 24 hours, the reaction mixture is triturated with water (200 ml.) and the insoluble solid is collected by filtration. This solid is dissolved in hot water (200 ml.) and acidified by the addition of 6 N hydrochloric acid. There is thus obtained 6.44 g. (66%) of yellow solid, M.P. 203–205° C. Recrystallization from acetonitrile yields 5.4 g. (55.6%) of 2,3-dichloro - 4 - (2-oxocyclobutylidenemethyl)phenol in the form of yellow prisms, M.P. 210.5–211.5° C.

*Analysis.*—Calculated for $C_{11}H_8Cl_2O_2$: C, 54.35; H, 3.32; Cl, 29.17. Found: C, 54.22; H, 3.44; Cl, 29.17.

Step B: [2,3-dichloro-4-(2 - oxocyclobutylidenemethyl)phenoxy]acetic acid.—To a solution of 2,3-dichloro-4-(2-oxocyclobutylidenemethyl)phenol (4.48 g., 0.0184 mole) in dimethylformamide (18 ml.) is added potassium carbonate (5.60 g., 0.0405 mole). Then ethyl bromoacetate (6.76 g., 0.0405 mole) is added and the reaction mixture is heated at 55–60° C. for 1.5 hours with stirring. The reaction mixture is cooled in ice and treated with water (90 ml.). The resulting solid ester is collected by filtration and washed with water.

The ester is treated with a mixture of acetic acid (30 ml.) and 5% hydrochloric acid (15 ml.) and heated on a steam bath for 20 minutes with stirring. The cooled reaction mixture is diluted with water (45 ml.) and the resulting yellow solid is collected by filtration. There is thus obtained 5.23 g. (94.6%) of material, M.P. 207–211° C. Recrystallization from acetic acid yields 4.08 g. (73.8%) of 2,3-dichloro-4-(2-oxocyclobutylidenemethyl)phenoxy] acetic acid in the form of yellow needles, M.P. 218–219° C.

*Analysis.*—Calculated for $C_{13}H_{10}Cl_2O_4$: C, 51.85; H, 3.35; Cl, 23.55. Found: C, 52.03; H, 3.47; Cl, 23.41.

EXAMPLE 5

[2,3-dichloro-4-(2-oxocyclopentylidenemethyl)phenoxy] acetic acid

Step A: 2,3-dichloro-4-(2 - oxocyclopentylidenemethyl)phenol.—To a solution of 2,3-dichloro - 4 - hydroxybenzaldehyde (5.73 g., 0.03 mole) in toluene (50 ml.) is added 4-(1-cyclopenten-1-yl)morpholine (5.52 g., 0.036 mole). Acetic acid (0.6 ml.) then is added and the reaction solution is heated under reflux until the evolution of water ceases.

After four hours, the reaction mixture is concentrated to dryness under reduced pressure. The residue is treated with a mixture of water, concentrated hydrochloric acid and chloroform and stirred vigorously. The chloroform layer is separated, washed with water and dried over anhydrous magnesium sulfate. The solvent is removed under reduced pressure and the residual solid is dissolved in hot aqueous sodium carbonate solution, treated with decolorizing carbon and filtered. The filtrate is acidified with 6 N hydrochloric acid to give a solid, 1.87 g. (24%), M.P. 180–183° C. Recrystallization from acetonitrile yields 1.11 g. (15%) of 2,3-dichloro-4-(2-oxocyclopentylidenemethyl)phenol in the form of yellow needles, M.P. 185–187° C.

Step B: [2,3-dichloro-4-(2 - oxocyclopentylidenemethyl)phenoxy]acetic acid.—To a solution of 2,3-dichloro-4-(2-oxocyclopentylidenemethyl)phenol (1.81 g., 0.007 mole) in dimethylformamide (7 ml.) is added potassium carbonate (2.13 g., 0.0154 mole). Ethyl bromoacetate (2.57 g., 0.0154 mole) then is added and the reaction mixture is heated at 55–60° C. for 1.5 hours with stirring.

The reaction mixture is cooled in ice and treated with water (35 ml.). The resulting solid ester is collected by filtration and washed with water.

The ester is treated with a mixture of acetic acid (12 ml.) and 5% hydrochloric acid (6 ml.) and heated on a steam bath for 0.5 hour with stirring. The cooled reaction solution is diluted with water (18 ml.) whereupon a solid separates. The solid is dissolved in ethanol (12 ml.) and treated with a solution of sodium bicarbonate (1.18 g., 0.014 mole) in water (24 ml.). The resulting solution is heated on a steam bath for 0.5 hour with stirring and then concentrated to dryness under reduced pressure. The residue is dissolved in hot water, treated with decolorizing carbon and filtered. The filtrate is acidified with 6 N hydrochloric acid whereupon a solid separates. There is thus obtained 2.07 g. (94%) of material, M.P. 212–214° C. Recrystallization from acetic acid yields 1.75 g. (80%) of [2,3-dichloro-4-(2-oxocyclopentylidenemethyl)phenoxy]acetic acid in the form of orange needles, M.P. 226–227° C.

EXAMPLE 6

[2,3-dichloro-4-(2-oxocyclopentylidenemethyl) phenoxy]acetic acid

Step A: 2,3-dichloro-4-(2-oxocyclopentylidenemethyl)-phenol.—To a solution of 2,3-dichloro-4-hydroxybenzaldehyde, Example 1, Step A, (3.82 g., 0.20 mole) in 12% aqueous sodium hydroxide solution (13.3 ml., 0.040 mole) is added cyclopentanone (3.36 g., 0.040 mole) and the resulting solution is allowed to stand at room temperature.

After 19 hours, the reaction mixture is dissolved in water (100 ml.) and acidified by the addition of 6 N hydrochloric acid. There is thus obtained 5.14 g. (100%) of yellow solid, M.P. 159–166° C. Recrystallization from acetonitrile yields 1.17 g. (22.8%) of 2,3-dichloro-4-(2-oxocyclopentylidenemethyl)phenol in the form of yellow needles, M.P. 185–187° C.

Analysis.—Calculated for $C_{12}H_{10}Cl_2O_2$: C, 56.06; H, 3.92; Cl, 27.58. Found: C, 56.16; H, 3.96; Cl, 27.42.

Step B: [2,3-dichloro-4-(2-oxocyclopentylidenemethyl)-phenoxy]acetic acid.—By following the procedure described in Example 5, Step B, 2,3-dichloro-4-(2-oxocyclopentylidenemethyl)phenol is converted to [2,3-dichloro-4 - (2 - oxocyclopentylidenemethyl)-phenoxy]acetic acid, M.P. 226–227° C.

EXAMPLE 7

[2,3-dichloro-4-(2-oxocyclopentylidenemethyl)phenoxy]acetic acid

To a solution of ethyl (2,3-dichloro-4-formylphenoxy)-acetate (4.16 g., 0.015 mole) in toluene (20 ml.) is added 4-(1-cyclopenten-1-yl)morpholine (2.75 g., 0.18 mole). Acetic acid (0.3 ml.) then is added and the reaction solution is heated under reflux until the evolution of water ceases.

After 2.25 hours the reaction mixture is concentrated to dryness under reduced pressure. The residual ester is treated with a mixture of acetic acid (25 ml.) and 5% hydrochloric acid (12.5 ml.) and heated on a steam bath for 0.5 hour with stirring. The cooled reaction solution is diluted with water and a solid separates. The solid is dissolved in ethanol (25 ml.) and treated with a solution of sodium bicarbonate (2.52 g., 0.03 mole) in water (50 ml.). The resulting solution is heated on a steam bath for 0.5 hour with stirring and then concentrated to dryness under reduced pressure. The residue is dissolved in hot water, treated with decolorizing carbon and filtered. The filtrate then is acidified with 6 N hydrochloric acid whereupon a solid separates. There is thus obtained 4.25 g. (90%) of material, M.P. 190–212° C. Recrystallization from acetic acid yields 3.43 g. (72.7%) of [2,3-dichloro - 4-(2-oxocyclopentylidenemethyl)phenoxy]acetic acid in the form of orange needles, M.P. 226–227° C.

Analysis.—Calculated for $C_{14}H_{12}Cl_2O_4$: C, 53.35; H, 3.84; Cl, 22.50. Found: C, 53.37; H, 3.94; Cl, 22.36.

EXAMPLE 8

[2,3-dichloro-4-(2-oxocyclopentylidenemethyl)phenoxy]acetic acid

Step A: Ethyl [2,3-dichloro-4-(phenyliminomethyl)-phenoxy]acetate.—To a solution of ethyl (2,3-dichloro-4-formylphenoxy)acetate (9.70 g., 0.035 mole) in benzene (50 ml.) is added aniline (3.59 g., 0.0385 mole). Then acetic acid (1 ml.) is added and the reaction solution is heated under reflux until the evolution of water ceases.

After 1.5 hours, the reaction mixture is concentrated to dryness under reduced pressure to give 12.3 g. (100%) of a yellow solid, M.P. 117.5–120.5° C. Recrystallization from butyl chloride yields 10.6 g. (86%) of [2,3-dichloro - 4 - (phenyliminomethyl)phenoxy]acetate in the form of needles, M.P. 119.5–120.5° C.

Analysis.—Calculated for $C_{17}H_{15}Cl_2NO_3$: C, 57.97; H, 4.29; N, 3.98. Found: C, 57.66; H, 4.45; N, 3.92.

Step B: [2,3-dichloro-4-(2-oxocyclopentylidenemethyl)-phenoxy]acetic acid.—To a solution of ethyl [2,3-dichloro-4-(phenyliminomethyl)phenoxy]acetate (2.11 g., 0.006 mole) in dimethylformamide (7.2 ml.) is added cyclopentanone (0.50 g., 0.006 mole) and concentrated hydrochloric acid (0.05 ml.). The resulting solution is allowed to stand at room temperature.

After 20 hours the reaction mixture is concentrated to dryness under reduced pressure and the residue is dissolved in acetic acid (9 ml.) and heated on a steam bath for 10 minutes. The cooled reaction solution then is treated with water to give a solid. The product is dissolved in ethanol (10 ml.) and treated with a solution of sodium bicarbonate (1.0 g., 0.012 mole) in water (20 ml.). The resulting solution is heated on a steam bath for one hour with stirring and then concentrated to dryness under reduced pressure. The residue is dissolved in hot water, treated with decolorizing carbon and filtered. The filtrate is acidified with 6 N hydrochloric acid and a solid separates. There is thus obtained 1.40 g. (74%) of material, M.P. 205–212° C. Recrystallization from acetic acid yields 1.19 g. (63%) of [2,3-dichloro-4-(2-oxocyclopentylidenemethyl)phenoxy]acetic acid in the form of orange needles, M.P. 226–227° C.

EXAMPLE 9

[2,3-dichloro-4-(2-oxocyclopentylidenemethyl)phenoxy] acetic acid

To a solution of 2,3-dichloro-4-(2-oxocyclopentylidenemethyl)phenol (1.00 g., 0.00389 mole) in acetone (50 ml.) is added potassium carbonate (1.06 g., 0.00778 mole) and iodoacetic acid (1.45 g., 0.00778 mole) and the resulting mixture is heated under reflux for 24 hours with stirring.

The reaction mixture is filtered and the collected solid is washed with boiling acetone. This solid is dissolved in water (100 ml.) and made acid to Congo red paper by the addition of 6 N hydrochloric acid. There is thus obtained 1.14 g. (93%) of an orange solid. Recrystallization from acetic acid gives 0.53 g. (43%) of [2,3-dichloro - 4 - (2 - oxocyclopentylidenemethyl)phenoxy] acetic acid in the form of orange needles, M.P. 226–227° C.

EXAMPLE 10

[2,3-dichloro-4-(2-oxocyclohexylidenemethyl)phenoxy] acetic acid

To a solution of ethyl (2,3-dichloro-4-formylphenoxy)-acetate (5.54 g., 0.02 mole) in toluene (25 ml.) is added 4-(1-cyclohexen-1-yl)morpholine (4.01 g., 0.024 mole). Acetic acid (1 ml.) then is added and the reaction solution is heated under reflux until the evolution of water ceases.

After three hours, the reaction mixture is concentrated to dryness under reduced pressure. The residual ester is treated with a mixture of acetic acid (35 ml.) and 5% hydrochloric acid (17.5 ml.) and heated on a steam bath for 0.5 hour with stirring. The cooled reaction mixture then is diluted with water whereupon a gum separates. The gum is dissolved in ethanol (35 ml.) and treated with a solution of sodium bicarbonate (3.36 g., 0.04 mole) in water (70 ml.). The resulting mixture is heated on a steam bath for 0.5 hour with stirring, filtered and the filtrate concentrated to dryness under reduced pressure. The residue is dissolved in hot water, treated with decolorizing carbon and filtered. The filtrate is acidified with 6 N hydrochloric acid and 3.91 g. (61%) of a solid separates. Recrystallization from benzene and then from acetonitrile yields 1.81 g. (28%) of [2,3-dichloro-4-(2-oxocyclohexylidenemethyl)phenoxy]acetic acid in the form of yellow prisms, M.P. 161–162° C.

Analysis.—Calculated for $C_{15}H_{14}Cl_2O_4$: C, 54.73; H, 4.29; Cl, 21.54. Found: C, 55.05; H, 4.52; Cl, 21.85.

EXAMPLE 11

[2,3-dichloro-4-(2-oxo-3-cyclopentylidenecyclopentylidenemethyl)phenoxy]acetic acid Step A: 2,3-dichloro-4-(2-oxo-3-cyclopentylidenecyclopentylidenemethyl)phenol.—To a solution of 2,3-dichloro-4-hydroxybenzaldehyde (5.73 g., 0.03 mole) in 12% aqueous sodium hydroxide solution (20 ml., 0.06 mole)

is added a solution of cyclopentanone (15.81 g., 0.188 mole) in ethanol (20 ml.) and the resulting solution is heated under reflux for three hours with stirring.

The cooled reaction solution is diluted with water (40 ml.) and acidified by the addition of 6 N hydrochloric acid. An oil separates which then is solidified by triturating with acetonitrile to yield 3.21 g. (33%) of material, M.P. 196–198° C. Recrystallization from acetic acid yields 2.17 g. (22.4%) of 2,3-dichloro-4-(2-oxo-3-cyclopentylidenecyclopentylidenemethyl)phenol in the form of yellow prisms, M.P. 214.5–215.5° C.

*Analysis.*—Calculated for $C_{17}H_{16}Cl_2O_2$: C, 63.17; H, 4.99; Cl, 21.94. Found: C, 63.43; H, 4.98; Cl, 22.10.

Step B: [2,3-dichloro-4-(2-oxo-3-cyclopentylidenecyclopentylidenemethyl)phenoxy]acetic acid.—To a solution of 2,3-dichloro-4-(2-oxo-3-cyclopentylidenecyclopentylidenemethyl)phenol (3.51 g., 0.0109 mole) in dimethylformamide (28 ml.) is added potassium carbonate (3.22 g., 0.0240 mole). Then ethyl bromoacetate (4.01 g., 0.0240 mole) is added and the reaction mixture is heated at 55–60° C. for 1.5 hours with stirring. The reaction mixture then is cooled in ice and treated with water (140 ml.). The resulting solid ester is collected by filtration and washed with water.

The ester is dissolved in ethanol (85 ml.) and treated with a solution of sodium bicarbonate (1.83 g., 0.0218 mole) in water (50 ml.). The resulting mixture is heated on a steam bath for one hour with stirring and then concentrated to dryness under reduced pressure. The residue is dissolved in boiling water (1100 ml.), treated with decolorizing carbon and filtered. The filtrate is acidified with 6 N hydrochloric acid whereupon a solid separates. There is thus obtained 3.91 g. (94%) of material, M.P. 210–212° C. Recrystallization from acetic acid yields 1.98 g. (48%) of [2,3-dichloro-4-(2-oxo-3-cyclopentylidenecyclopentylidenemethyl)phenoxy]acetic acid in the form of yellow needles, M.P. 217–218° C.

*Analysis.*—Calculated for $C_{19}H_{18}Cl_2O_4$: C, 59.86; H, 4.76; Cl, 18.60. Found: C, 59.78; H, 4.96; Cl, 18.70.

EXAMPLE 12

2-diethylaminoethyl [2,3-dichloro-4-(2-methyl-3-oxo-1-butenyl)phenoxy]acetate hydrochloride A mixture of [2,3-dichloro-4-(2-methyl-3-oxo-1-butenyl)phenoxy]acetic acid (3.0 g., 0.01 mole), thionyl chloride (4.8 g., 0.04 mole) and benzene (30 ml.) is refluxed for 35 minutes whereupon a clear solution is obtained. Volatile materials are removed by vacuum distillation leaving [2,3-dichloro-4-(2-methyl-3-oxo-1-butenyl)phenoxy]acetyl chloride as a viscous residue. The acid chloride is added to a solution of 2-diethylaminoethanol (2.8 g., 0.024 mole) in ether (50 ml.). The resulting mixture is extracted with water and the ether solution is dried and treated with hydrogen chloride to precipitate the hydrochloric acid salt of the product. The crude product is recrystallized from isopropyl alcohol to obtain pure 2-diethylaminoethyl [2,3-dichloro-4-(2-methyl-3-oxo-1-butenyl)phenoxy]acetate hydrochloride.

EXAMPLE 13

N-methoxy-2-[2,3-dichloro-4-(2-methyl-3-oxo-1-butenyl)phenoxy]acetamide

A mixture of [2,3-dichloro-4-(2-methyl-3-oxo-1-butenyl)phenoxy]acetic acid (1.5 g., 0.005 mole), thionyl chloride (2.4 g., 0.02 mole) and benzene (15 ml.) is refluxed for 35 minutes whereupon a clear solution is obtained. Then the volatile materials are removed by vacuum distillation leaving [2,3-dichloro-4-(2-methyl-3-oxo-1-butenyl)phenoxy]acetyl chloride as a viscous oil.

A solution of methoxyamine is prepared by adding methoxyamine hydrochloride (1.3 g., 0.015 mole) to a solution of sodium (0.35 g., 0.015 g.-atom) in ethanol (8 ml.). To this solution, the acid chloride is added and, after 10 minutes, the mixture is diluted with water (30 ml.) to precipitate the solid product. Recrystallization from isopropyl alcohol yields pure N-methoxy-2-[2,3-dichloro-4-(2-methyl-3-oxo-1-butenyl)phenoxy]acetamide.

EXAMPLE 14

[2,3-dichloro-4-(2-oxocyclopentylidenemethyl)phenoxy]acetamide

A mixture of [2,3-dichloro-4-(2-oxocyclopentylidenemethyl)phenoxy]acetic acid (3.2 g., 0.01 mole), thionyl chloride (4.8 g., 0.04 mole) and benzene (30 ml.) is refluxed for 45 minutes whereupon a clear solution is obtained. Volatile materials are removed by vacuum distillation leaving (2,3-dichloro-4-(2-oxocyclopentylidenemethyl)phenoxy]acetyl chloride as a viscous oil.

Anhydrous ammonia is added during 15 minutes to a solution of the acid chloride in benzene (50 ml.). After removal of ammonium chloride by filtration, the filtrate is concentrated to yield [2,3-dichloro-4-(2-oxocyclopentylidenemethyl)phenoxy]acetamide.

EXAMPLE 15

[3-(2-methyl-3-oxo-1-pentenyl)-4-chlorophenoxy]acetic acid

Step A: Ethyl (3-formyl-4-chlorophenoxy)acetate.—A ssupension of 3-hydroxy-6-chlorobenzaldehyde (7.6 g., 0.0396 mole) and potassium carbonate (13.2 g., 0.1 mole) in dimethylformamide (30 ml.) is treated with ethyl bromoacetate (16.7 g., 0.1 mole). This mixture is stirred at 55° C. for 1.5 hours and then cooled, diluted with water and extracted with ether. The ethereal solution is washed with water, dried and concentrated in vacuo to produce an oil which then is distilled to yield an oily product having a boiling point of 155–175° C./.05 mm. This product crystallizes to give 3.6 g. (38%) of ethyl (3-formyl-4-chlorophenoxy)acetate having a melting point of 54–56° C. After recrystallization from butyl chloride the ethyl (3-formyl-4-chlorophenoxy)acetate has a melting point of 58–60° C.

*Analysis.*—Calculated for $C_{11}H_{11}ClO_4$: C, 54.44; H, 4.57. Found: C, 54.67; H, 4.76.

Step B: [3-(2-methyl-3-oxo-1-pentenyl)-4-chlorophenoxy)acetic acid.—By substituting ethyl (3-formyl-4-chlorophenoxy)acetate for the ethyl (2,3-dichloro-4-formylphenoxy)acetate recited in Example 3, Step B, and following the procedure described therein, the product [3-(2-methyl-3-oxo-1-pentenyl)-4-chlorophenoxy]acetic acid is obtained.

EXAMPLE 16

[2-(2-methyl-3-oxo-1-pentenyl)-4-chlorophenoxy]acetic acid

Step A: Ethyl (2-formyl-4-chlorophenoxy)acetate.—By substituting 5-chlorosalicylaldehyde for the 2,3-dichloro-4-hydroxybenzaldehyde of Example 3, Step A, and following the procedure described therein, ethyl (2-formyl-4-chlorophenoxy)acetate is obtained. The product then is recrystallized from a mixture of benzene and cyclohexane to yield ethyl (2-formyl-4-chlorophenoxy)acetate in 71% yield, M.P. 51–54.5° C.

Step B: [2-(2-methyl-3-oxo-1-pentenyl)-4-chlorophenoxy]acetic acid.—By substituting ethyl (2-formyl-4-chlorophenoxy)acetate for the ethyl (2,3-dichloro-4-formylphenoxy)acetate of Example 3, Step B, and following the procedure described therein, the product [2-(2-methyl-3-oxo-1-pentenyl)-4-chlorophenoxy]acetic acid is obtained.

EXAMPLE 17

[2-(2-methyl-3-oxo-1-pentenyl)-4-acetamidophenoxy]acetic acid

By substituting 5-acetamidosalicylaldehyde for the 2,3-dichloro-4-hydroxybenzaldehyde of Example 3, Step A and following the procedure described in Steps A and B of that example, the product [2-(2-methyl-3-oxo-1-pentenyl)-4-acetamidophenoxy]acetic acid is obtained.

EXAMPLE 18

[3-chloro-4-(3-oxo-1-butenyl)phenoxy]acetic acid

Step A: (3-chloro-4-formylphenoxy)acetic acid.—A solution of 2-chloro-4-hydroxybenzaldehyde (15.0 g., 0.096 mole) in 1,2-dimethoxyethane (50 ml.) is added to a suspension of sodium hydride (2.9 g., 0.12 mole) in 1, 2-dimethoxyethane (35 ml.). Ethyl bromoacetate (20.0 g., 0.12 mole) then is added dropwise during 20 minutes with stirring. The mixture is stirred and refluxed for one hour. The precipitated sodium bromide is filtered off and the solvent is distilled in vacuo leaving ethyl (3-chloro-4-formylphenoxy)acetate as a residual oil.

To the residual ethyl (3-chloro-4-formylphenoxy) acetate, ethanol (40 ml.) and 10% sodium hydroxide solution (100 ml.) are added and the resulting solution is heated 10 minutes on the steam bath. The solution then is acidified with concentrated hydrochloric acid to precipitate the product, which is recrystallized from aqueous acid to yield 15.5 g. (78%) of (3-chloro-4-formylphenoxy) acetic acid, M.P. 174–176.5° C.

*Analysis.*—Calculated for $C_9H_7ClO_4$: C, 50.37; H, 3.29. Found: C, 50.39; H, 3.47.

Step B: [3-chloro-4-(3-oxo-1-butenyl)phenoxy]acetic acid.—A solution of (3-chloro-4-formylphenoxy)acetic acid (4.3 g., 0.02 mole) in 5% sodium hydroxide solution (12 ml.) and acetone (40 ml.) is allowed to stand at room temperature for 30 minutes and then is diluted with water (30 ml.) and acidified with 5% hydrochloric acid. The solid product which precipitates is recrystallized from isopropyl alcohol to yield 2.4 g. (47%) of [3-chloro-4-(3-oxo-1-butenyl)phenoxy]acetic acid, M.P. 169.5–172.5° C.

*Analysis.*—Calculated for $C_{12}H_{11}ClO_4$: C, 56.59; H, 4.35. Found: C, 56.52; H, 4.39.

EXAMPLE 19

3-[2,3-dichloro-4-(3-oxo-1-butenyl)phenoxy]propionic acid

Step A: 3 - (2,3-dichloro-4-formylphenoxy)propionic acid.—2,3-dichloro-4-hydroxybenzaldehyde (38.2 g., 0.2 mole) is dissolved in a 10% sodium hydroxide solution (200 ml.). The solution is heated to boiling and beta-propiolactone (144 g., 2.0 moles) is added dropwise at such a rate as to keep the solution boiling. During the addition 10% sodium hydroxide solution is added in portions to maintain an alkaline mixture. Then the solution is cooled and acidified. The precipitated material is dissolved in ether and the product is extracted into a 5% sodium bicarbonate solution. Acidification of the aqueous solution precipitates 3 - (2,3-dichloro-4-formylphenoxy)propionic acid, which is purified by recrystallization from ethyl acetate.

Step B: 3-[2,3-dichloro-4-(3-oxo-1-butenyl)phenoxy]propionic acid.—By substituting 3-(2,3-dichloro-4-formylphenoxy)propionic acid for the (3-chloro-4-formylphenoxy)acetic acid of Example 18, Step B, and following the procedure described therein, the product 3-[2,3-dichloro-4-(3-oxo-1-butenyl)phenoxy]propionic acid is obtained.

EXAMPLE 20

[2,3-dichloro-4-(3-oxo-1-butenyl)phenoxy]acetoxy acid

Step A: 2,3-dichloro-4-(3-oxo-1-butenyl)phenol.—Acetone (7.25 g., 0.125 mole) is added to a solution of 2,3-dichloro-4-hydroxybenzaldehyde (3.82 g., 0.020 mole) in 12% aqueous sodium hydroxide (7 ml., 0.021 mole) and the resulting solution is allowed to stand at room temperature.

After two days the reaction mixture is diluted with water (25 ml.) and acidified by the addition of 6 N hydrochloric acid. There is thus obtained 4.18 g. of an orange solid having a melting point of 182–183° C. Recrystallization from acetonitrile gives 2,3-dichloro-4-(3-oxo-1-butenyl)phenol in the form of yellow prisms, M.P. 188.5–189.5° C.

*Analysis.*—Calculated for $C_{10}H_8Cl_2O_2$: C, 51.98; H, 3.49; Cl, 30.69. Found: C, 51.94; H, 3.49; Cl, 30.60.

Step B: [2,3 - dichloro-4-(3-oxo-1-butenyl)phenoxy] acetic acid.—To a solution of 2,3-dichloro-4-(3-oxo-1-butenyl)phenol (5.11 g., 0.0221 mole) in dimethylformamide (20 ml.) is added potassium carbonate (6.72 g., 0.0486 mole). Then ethyl bromoacetate (8.12 g., 0.0486 mole) is added and the reaction mixture is heated at 55–60° C. for 1.5 hours with stirring.

The reaction mixture is cooled in ice and treated with water (100 ml.) whereafter the resulting solid ester is collected by filtration and washed with water. The esterified product then is treated with a mixture of acetic acid (35 ml.) and 5% hydrochloric acid (17.5 ml.) and heated on a steam bath for 0.5 hour with stirring. The cooled reaction solution then is diluted with water (55 ml.) to yield 6.53 g. of a yellow solid having a melting point of 198–202° C. Recrystallization from isopropyl alcohol gives [2,3-dichloro-4-(3-oxo-1-butenyl)phenoxy]acetic acid in the form of yellow needles, M.P. 204–205° C.

*Analysis.*—Calculated for $C_{12}H_{10}Cl_2O_4$: C, 49.85; H, 3.49; Cl, 24.53. Found: C, 50.00; H, 3.79; Cl, 24.55.

EXAMPLE 21

[2,3-dichloro-4-(3-oxo-1-pentenyl)phenoxy]acetic acid

Step A: (2,3-dichloro-4-formylphenoxy)acetic acid.— A solution of ethyl (2,3-dichloro-4-formylphenoxy)acetate (50 g., 0.151 mole) and sodium bicarbonate (25.5 g., 0.3 mole) in ethanol (450 ml.) and water (900 ml.) is heated two hours on a steam bath and the solution then is cooled. The sodium salt of the product which precipitates is collected by filtration, dissolved in boiling water (1500 ml.) and the solution acidified with concentrated hydrochloric acid to precipitate 40 g. (94%) of (2,3-dichloro-4-formylphenoxy)acetic acid, M.P. 204–210° C. Recrystallization from acetonitrile gives pure (2,3-dichloro-4-formylphenoxy)acetic acid, M.P. 210–212° C.

*Analysis.*—Calculated for $C_9H_6Cl_2O_4$: C, 43.40; H, 2.43; Cl, 28.47. Found: C, 43.22; H, 2.69; Cl, 28.28.

Step B: [2,3-dichloro-4-(3-oxo-1-pentenyl)phenoxy]-acetic acid.—A mixture of (2,3-dichloro-4-formylphenoxy)acetic acid (12.5 g., 0.05 mole), methyl ethyl ketone (30.2 g., 0.42 mole), 5% sodium hydroxide solution (50 ml.) and water (100 ml.) is stirred 30 minutes at room temperature. The sodium salt of the acid which initially precipitates gradually goes into solution. The solution is acidified with concentrated hydrochloric acid to precipitate a solid product which then is stirred with sodium bicarbonate solution to obtain the sparingly soluble sodium salt of [2,3-dichloro-4-(3-oxo-1-pentenyl)phenoxy]acetic acid. The salt is collected on a filter, dissolved in boiling water (200 ml.) and the solution acidified with concentrated hydrochloric acid. The product which precipitates is collected, dried and recrystallized three times from isopropyl alcohol to obtain 1.5 g. (10%) of [2,3-dichloro-4-(3-oxo-1-pentenyl)phenoxy]acetic acid, M.P. 193.5–194.5° C.

*Analysis.*—Calculated for $C_{13}H_{12}Cl_2O_4$: C, 51.50; H, 3.99; Cl, 23.39. Found: C, 51.91; H, 4.14; Cl, 23.45.

In a manner similar to that described in Example 1, Steps B and C, supra, for the preparation of [2,3-dichloro - 4 - (2 - methyl-3-oxo-1-butenyl)phenoxy]acetic acid, most of the [(3-oxo-1-alkenyl)aryloxy]alkanoic acid products (I) of the invention may be obtained. Thus, by substituting an appropriate nuclear hydroxy substituted benzaldehyde, an appropriate ketone and a suitable alkyl haloalkenoate for the 2,3-dichloro-4-hydroxybenzaldehyde, the methyl ethyl ketone and the ethyl bromoacetate recited in Example 1, Steps B and C, and following substantialy the procedure described therein, all of the [(3-oxo-1-alkenyl)aryloxy]alkanoic acid products (I) of this invention may be obtained. The following equation illustrates the reaction of Example 1, Steps A and B and, together with Table I, depict the nuclear hydroxy substituted benzaldehyde and alkyl haloalkanoate starting materials of the process and the corresponding products produced therefrom:

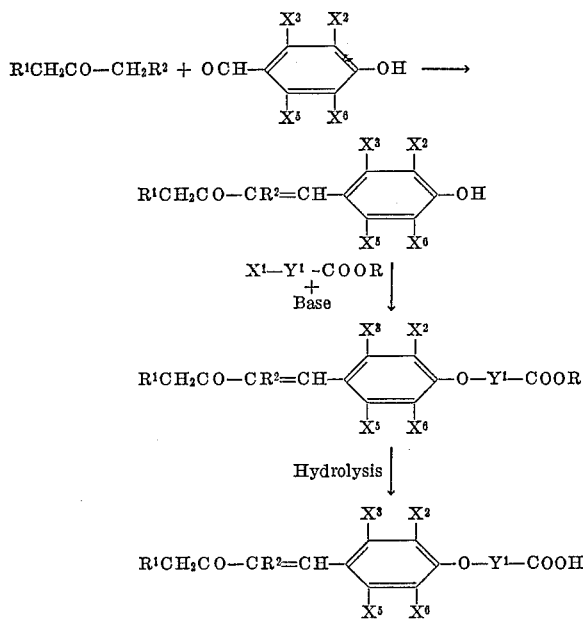

and then lactose and magnesium stearate are passed through a No. 60 bolting cloth onto the powder and the combined ingredients admixed for 10 minutes and then filled into No. 1 dry gelatin capsules.

Similar dry-filled capsules can be prepared by replacing the active ingredient of the above example by any of the other novel compounds of this invention.

It will be apparent from the foregoing description that the [(3-oxo-1-alkenyl)aryloxy]alkanoic acid products (I) of this invention constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A member selected from the group consisting of a compound having the formula:

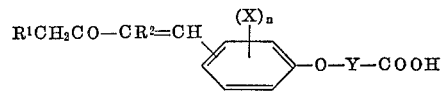

wherein $R^1$ and $R^2$ are similar or dissimilar members selected from the group consisting of hydrogen, lower alkyl and, taken together, $R^1$ and $R^2$ may be joined to form an alkylene chain containing from one to three carbon atoms between their points of attachment to the

TABLE

| Ex. | R | $R^1$ | $R^2$ | $X^2$ | $X^3$ | $X^5$ | $X^6$ | $Y^1$ |
|---|---|---|---|---|---|---|---|---|
| 22 | —$C_2H_5$ | —$CH_3$ | —$CH_3$ | H | —$NO_2$ | H | H | —$CH_2$— |
| 23 | —$CH_3$ | H | —$CH_3$ | H | Br | H | H | —$CH_2$— |
| 24 | —$C_2H_5$ | —$CH_3$ | —$CH_3$ | —$CH_3$ | H | H | —$CH_3$ | —$CH_2$— |
| 25 | —$CH_3$ | —$CH_2$—$CH_2$— | | H | Cl | H | H | —$(CH_2)_3$— |
| 26 | —$C_2H_5$ | H | —$CH_3$ | —$CH_3$ | —$CH_3$ | —$CH_3$ | —$CH_3$ | —$CHCH_3$— |
| 27 | —$CH_3$ | —$CH_2$— | | H | F | H | H | —$CH_2$— |
| 28 | —$CH_3$ | H | —$CH_3$ | H | —$CH_3$ | —$CH_3$ | H | —$(CH_2)_3$— |
| 29 | —$C_2H_5$ | —$CH_3$ | —$CH_3$ | —$(CH_2)_4$— | | H | H | —$CH_2$— |
| 30 | —$C_2H_5$ | H | —$CH_3$ | —CH=CH— | —CH=CH— | H | H | —$CH_2$— |
| 31 | —$C_2H_5$ | H | —$CH_3$ | —$CH_3$ | —$CH_3$ | H | H | —$CH_2$— |

A suitable unit dosage form of the products of this invention can be administered by mixing 50 mg. of a [(3-oxo-1-alkenyl)aryloxy]alkanoic acid (I) or a suitable acid addition salt, ester or amide derivative thereof, with 144 mg. of lactose and 6 mg. of magnesium stearate and placing the 200 mg. mixture into a No. 1 gelatin capsule. Similarly, by employing more of the active ingredient and less lactose, other dosage forms can be put up in No. 1 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well-known to pharmacists.

It is also within the scope of this invention to combine two or more of the compounds of this invention in a unit dosage form or to combine one or more of the compounds with other known diuretics and saluretics or with other desired therapeutic and/or nutritive agents in dosage unit form.

The following example is included to illustrate the preparation of a representative dosage form:

EXAMPLE 32

Dry-filled capsules containing 50 mg. of active ingredient per capsule

Per capsule, mg.

[2,3 - dichloro - 4 - (2 - methyl - 3 - oxo - 1 - butenyl)phenoxy]acetic acid _____ 50
Lactose _____ 144
Magnesium stearate _____ 6

Capsule size No. 1 _____ 200

The [2,3 - dichloro - 4 - (2 - methyl - 3 - oxo - 1 - butenyl)phenoxy]acetic acid is reduced to a No. 60 powder and then lactose and magnesium stearate are passed through a No. 60 bolting cloth onto the powder and the combined ingredients admixed for 10 minutes and then filled into No. 1 dry gelatin capsules.

acylvinyl group, or, $R^1$ and $R^2$ may be joined to form an alkylene chain containing from two to three carbon atoms between its points of attachment to the acylvinyl group and which said alkylene chain is substituted with a cyclopentylidene radical; the X radicals are similar or dissimilar members selected from the group consisting of halogen, lower alkyl, nitro, lower alkanamido and, taken together, two X radicals on adjacent carbon atoms of the benzene ring may be joined to form an hydrocarbylene chain selected from trimethylene, tetramethylene and 1,3-butadienylene; Y is a member selected from the group consisting of alkylene and haloalkylene and $n$ is an integer having a value of one to four; and the nontoxic, pharmacologically acceptable acid addition salts, lower alkyl esters, di-lower alkylamino lower alkyl esters and the amide and methoxyamide derivatives thereof.

2. A compound having the formula:

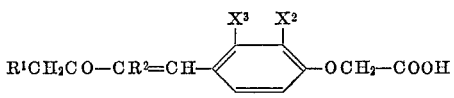

wherein $R^1$ and $R^2$ are similar or dissimilar members selected from the group consisting of hydrogen and lower alkyl and $X^2$ and $X^3$ are similar or dissimilar members selected from the group consisting of halogen, lower alkyl and, taken together, may be joined to form a 1,3-butadienylene chain.

3. The compound of claim 2 wherein $R^1$ and $R^2$ are lower alkyl and $X^2$ and $X^3$ are halogen.

4. The compound of claim 2 wherein $R^1$ is lower alkyl, $R^2$ is hydrogen and $X^2$ and $X^3$ are halogen.

5. The compound of claim 2 wherein $R^1$ and $R^2$ are lower alkyl, $X^2$ is hydrogen and $X^3$ is halogen.

6. The compound of claim 2 wherein $R^1$ and $R^2$ are lower alkyl and $X^2$ and $X^3$ are lower alkyl.

7. The compound of claim 2 wherein $R^1$ and $R^2$ are lower alkyl and $X^2$ and $X^3$ are combined to form a 1,3-butadienylene chain.

8. The compound of claim 2 wherein $R^1$ and $R^2$ are joined to form an alkylene chain of the formula —$C_mH_{2m}$— wherein $m$ is an integer having a value of one to three.

9. [2,3-dichloro-4-(2-methyl-3-oxo-1-butenyl)phenoxy] acetic acid.

10. [2,3-dimethyl-4-(2-methyl-3-oxo-1-butenyl)phenoxy] acetic acid.

11. [2,3 - dichloro - 4 - (2 - oxocyclobutylidenemethyl) phenoxy]acetic acid.

12. [2,3 - dichloro - 4 - (2-oxocyclopentylidenemethyl) phenoxy]acetic acid.

13. [2,3 - dichloro - 4 - (2 - oxocyclohexylidenemethyl) phenoxy]acetic acid.

14. [2 - methyl - 3-chloro-4-(3-oxo-1-butenyl)phenoxy] acetic acid.

15. [2,3 - dichloro - 4-(3-oxo-1-butenyl)phenoxy]acetic acid.

16. [(2-methyl-3-oxo-1-butenyl)naphthoxy]acetic acid.

References Cited

UNITED STATES PATENTS 3,255,241  6/1966  Schultz et al. _____ 260—516

LORRAINE A. WEINBERGER, Primary Examiner

J. NIELSEN, Assistant Examiner

U.S. Cl. X.R.

260—247.2, 268, 294, 326.3, 471, 473, 501.1, 519, 521, 559, 590, 600; 424—317, 324